J. TORRENT, Jr.
RESILIENT HUB.
APPLICATION FILED MAY 27, 1919.
1,328,858.
Patented Jan. 27, 1920.
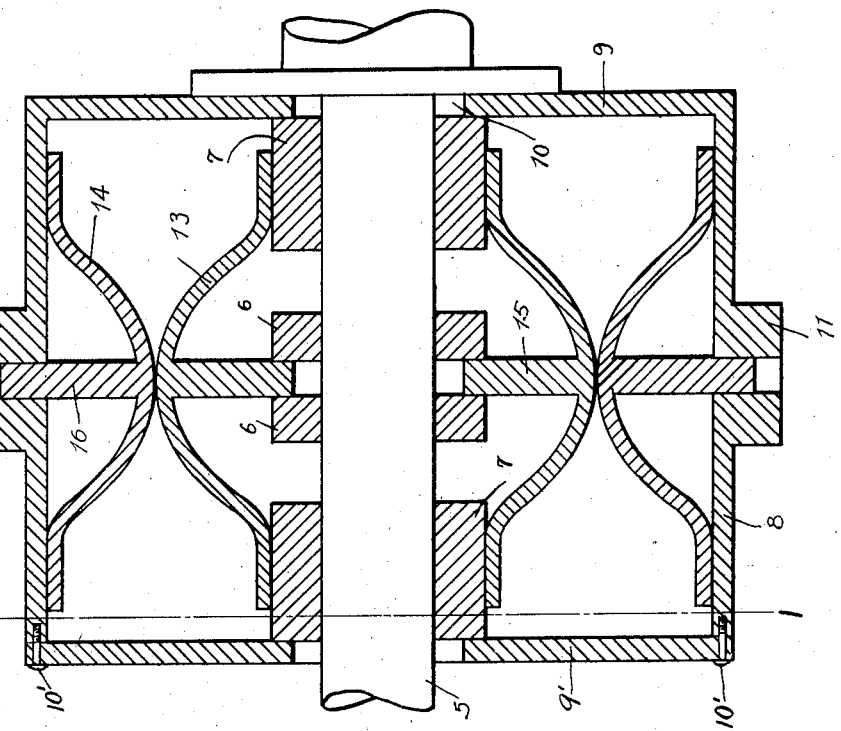
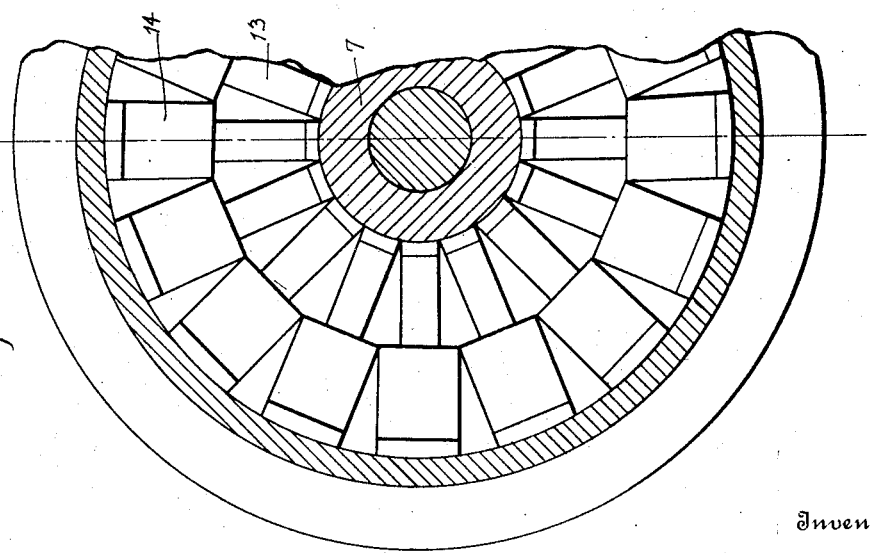

UNITED STATES PATENT OFFICE.

JOHN TORRENT, JR., OF MUSKEGON, MICHIGAN.

RESILIENT HUB.

1,328,858.  Specification of Letters Patent.  Patented Jan. 27, 1920.

Application filed May 27, 1919. Serial No. 300,037.

*To all whom it may concern:*

Be it known that I, JOHN TORRENT, Jr., a citizen of the United States, residing at Muskegon, in the county of Muskegon and State of Michigan, have invented a new and useful Resilient Hub, of which the following is a specification.

The present invention relates to resilient vehicle wheel hubs, the primary object being to provide a resilient hub which possesses a high degree of resiliency and which will dispense with pneumatic tires now conventionally used, or which may be used in conjunction therewith.

A second object of the invention is to provide a resilient hub for vehicle wheels which includes shock absorbing springs interposed between the hub and the axle which are of a novel construction.

A further object of the invention is to provide a resilient hub embodying a plurality of leaf springs so arranged in the hub as to permit any one or more to be removed and a new one substituted therefor.

Still another object of the invention is to provide a hub possessing a maximum of resilient qualities and which at the same time is prevented from shifting on the axle.

An additional general object is to provide a hub having the above characteristics, which is simple in construction, which consists of few parts that may be readily assembled and disassembled, and which may be manufactured and placed on the market at a minimum cost.

With the above and other general objects and advantages in mind, the invention consists of the combinations of elements, constructions and arrangements of parts, operations and formations and general assemblage the details of which will be hereinafter enlarged upon and recited in the sub-joined claim, the invention being illustrated in the accompanying drawings, wherein:—

Figure 1 is a fragmentary view partly in section and partly in elevation of a resilient hub embodying my invention, taken on line 1—1 of Fig. 2; and Fig. 2 is a vertical sectional view taken through the center of the hub as indicated in line 3—3 of Fig. 1.

Like characters of reference designate like parts on all of the views.

Referring to the drawing in detail the axle is designated at 5 upon which is mounted a pair of spaced collars 6 to afford an annular groove therebetween. Fixed to the axle 5 upon opposite sides of the collars 6 are bearings 7.

The boxing or axle housing is designated at 8 and formed with plates 9 and the plate 9' being removably secured to the housing and these plates having horizontal central alined openings 10 therein through which the axle 5 extends. Formed upon the periphery of the boxing 8 and extending circumferentially thereof and centrally of the same is an annular beading or enlargement 11 provided with a circumferentially extending slot 12.

Extending longitudinally of the axle and arranged in radial relation thereto is a plurality of bowed leaf springs 13 having their ends extended laterally and positioned upon bearings 7. A plurality of leaf springs 14 of the same construction as the leaf springs 13 are positioned in the hub with their ends bearing against the axle housing and their bowed parts engaging the bowed parts of the springs 13. Formed upon the inner face of each of the leaf springs 13 and projecting inwardly and radially from the axle are stems 15 having their inner ends disposed between the rings or collars 6 and capable of radial movement therein when the springs are placed under strain. Like stems 16 are formed upon the outer face of the springs 14 at the crest thereof and extend radially from the axle and are disposed in alinement with the stems 15, the stems 16 being slidably engaged in the slot 12 in the beading or annular enlargement 11.

It will be thus seen that when the springs are placed under strain the bowed portions thereof will yield, the stems carried by the springs preventing the latter from shifting laterally.

From the foregoing it is obvious that when a wheel supplied with the cushioning hub as described, meets with an obstruction in the surface over which the same is operating, the hub will move radially with respect to the axle 5, against the tension of the springs 13 and 14, which restrict such movement, to the end that the cushioning result is accomplished.

The embodiment of the invention herein shown and described is considered the preferred construction, but it is to be understood that the same may be modified and altered in many respects and that my limits of such modification are governed only by what is claimed.

What is claimed is:—

In a resilient hub, an axle, a housing embracing a portion of the axle, said housing and axle being relatively radially movable, spaced collars supported on the axle and providing a slot, bearings supported on the axle within the housing, bowed springs disposed adjacent the axle, and bowed springs disposed adjacent the inner wall of the housing, the bowed springs adjacent the axle contacting with the bearing members, the contacting springs being arranged in pairs, and means carried by the springs adjacent the axle for operating within the slot for preventing lateral movement of the central portions of the springs.

In testimony that I claim the foregoing as my own, I have hereto affixed my signature in the presence of two witnesses.

JOHN TORRENT, Jr.

Witnesses:
 FREDERICK D. TORRENT,
 HARRY A. MORRIS.